US010503989B2

(12) United States Patent
Nishino

(10) Patent No.: US 10,503,989 B2
(45) Date of Patent: Dec. 10, 2019

(54) IMAGE PROCESSING APPARATUS, IMAGING APPARATUS, CAMERA MONITOR SYSTEM, AND IMAGE PROCESSING METHOD

(71) Applicant: KYOCERA Corporation, Kyoto (JP)

(72) Inventor: Tomoo Nishino, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/763,321

(22) PCT Filed: Sep. 28, 2016

(86) PCT No.: PCT/JP2016/004379
§ 371 (c)(1),
(2) Date: Mar. 26, 2018

(87) PCT Pub. No.: WO2017/056495
PCT Pub. Date: Apr. 6, 2017

(65) Prior Publication Data
US 2018/0285666 A1   Oct. 4, 2018

(30) Foreign Application Priority Data
Sep. 28, 2015   (JP) ................. 2015-190434

(51) Int. Cl.
H04N 7/18   (2006.01)
G06K 9/00   (2006.01)
(Continued)

(52) U.S. Cl.
CPC ............ *G06K 9/00845* (2013.01); *B60R 1/00* (2013.01); *G02B 27/0093* (2013.01);
(Continued)

(58) Field of Classification Search
CPC .. H04N 7/18; G06K 9/00845; G06K 9/00791; B60R 1/00; B60R 2300/30; B60R 2300/80; G06F 3/013
(Continued)

(56) References Cited

U.S. PATENT DOCUMENTS 8,179,435 B2 * 5/2012 Akatsuka ............... G09B 19/16
348/113
9,317,759 B2 * 4/2016 Inada ..................... B60K 35/00
(Continued)

FOREIGN PATENT DOCUMENTS

JP   2005-335410 A   12/2005
JP   2007-096638 A    4/2007
(Continued)

OTHER PUBLICATIONS

International Search Report issued in PCT/JP2016/004379; dated Dec. 13, 2016.
(Continued)

Primary Examiner — Trang U Tran
(74) Attorney, Agent, or Firm — Studebaker & Brackett PC

(57) ABSTRACT

An image processing apparatus includes a communication interface configured to receive a first captured image capturing a face of a subject in a moving body, and a controller configured to change at least one of a position and a size of a specific region in either the first captured image or a second captured image different from the first captured image, according to at least one of a position and an orientation of the face of the subject determined on the basis of the first captured image, as well as a direction of a line-of-sight of the subject.

12 Claims, 11 Drawing Sheets

(51) Int. Cl.
*B60R 1/00* (2006.01)
*G06F 3/01* (2006.01)
*G02B 27/00* (2006.01)

(52) U.S. Cl.
CPC .............. *G06F 3/012* (2013.01); *G06F 3/013* (2013.01); *G06K 9/00791* (2013.01); *H04N 7/18* (2013.01); *B60R 2300/30* (2013.01); *B60R 2300/80* (2013.01)

(58) Field of Classification Search
USPC .......................................... 348/148, 113, 115
See application file for complete search history.

(56) References Cited

U.S. PATENT DOCUMENTS

| | | | |
|---|---|---|---|
| 9,635,311 B2* | 4/2017 | Tokui | ................. H04N 21/4223 |
| 2007/0072154 A1 | 3/2007 | Akatsuka et al. | |

FOREIGN PATENT DOCUMENTS

| | | | |
|---|---|---|---|
| JP | 2008-141578 A | 6/2008 |
| JP | 2009-040113 A | 2/2009 |
| JP | 2010-116124 A | 5/2010 |
| JP | 2010-179850 A | 8/2010 |
| JP | 2011-188028 A | 9/2011 |
| JP | 2014-045265 A | 3/2014 |

OTHER PUBLICATIONS

Written Opinion issued in PCT/JP2016/004379; dated Dec. 13, 2016.

* cited by examiner

FIG. 4

| First parameter | Second parameter | Third parameter | Fourth parameter | Position | Orientation | Line-of-sight |
|---|---|---|---|---|---|---|
| **** | **** | **** | **** | **** | **** | **** |
| ... | ... | ... | ... | ... | ... | ... |

IMAGE PROCESSING APPARATUS, IMAGING APPARATUS, CAMERA MONITOR SYSTEM, AND IMAGE PROCESSING METHOD

CROSS REFERENCE TO RELATED APPLICATION

This application claims priority to and the benefit of Japanese Patent Application No. 2015-190434 filed on Sep. 28, 2015, the entire contents of which are incorporated herein by reference.

TECHNICAL FIELD

The present disclosure relates to an image processing apparatus configured to display a captured image capturing surroundings of a moving body such as a vehicle, an imaging apparatus, a CMS (Camera Monitor System), and an image processing method.

BACKGROUND

Camera monitor systems configured to display, for example, an image behind a moving body on a display (a digital mirror) are conventionally known.

SUMMARY

An image processing apparatus according to an embodiment of the present disclosure includes: a communication interface configured to receive a first captured image capturing a face of a subject in a moving body; and a controller configured to change at least one of a position and a size of a specific region in either the first captured image or a second captured image different from the first captured image, according to at least one of a position and an orientation of the face of the subject determined on the basis of the first captured image, as well as a direction of a line-of-sight of the subject.

An imaging apparatus according to an embodiment of the present disclosure includes: an imaging unit configured to generate a captured image capturing an area outside a moving body; a communication interface configured to acquire information indicating at least one of a position and an orientation of a face of a subject in the moving body and a direction of a line-of-sight of the subject; and a controller configured to change at least one of a position and a size of a specific region in the captured image on the basis of the information.

An imaging apparatus according to an embodiment of the present disclosure includes: an imaging unit configured to generate a first captured image capturing a face of a subject in a moving body; a controller configured to change at least one of a position and a size of a specific region in either the first captured image or a second captured image different from the first captured image, according to at least one of a position and an orientation of the face of the subject determined on the basis of the first captured image, as well as a direction of a line-of-sight of the subject; and a communication interface configured to output information indicating the specific region in the second captured image or an image of the specific region clipped from the first captured image.

A camera monitor system according to an embodiment of the present disclosure includes an image processing apparatus including: a communication interface configured to receive a first captured image capturing a face of a subject in a moving body: and a controller configured to change at least one of a position and a size of a specific region in either the first captured image or a second captured image different from the first captured image, according to at least one of a position and an orientation of the face of the subject determined on the basis of the first captured image, as well as a direction of a line-of-sight of the subject. The camera monitor system according to the embodiment of the present disclosure also includes a display apparatus configured to display an image of a specific region clipped from the first captured image or the second captured image.

An image processing method according to an embodiment of the present disclosure includes: a step of receiving a first captured image capturing a face of a subject in a moving body; and a step of changing at least one of a position and a size of a specific region in either the first captured image or a second captured image different from the first captured image, according to at least one of a position and an orientation of the face of the subject determined on the basis of the first captured image, as well as a direction of a line-of-sight of the subject.

BRIEF DESCRIPTION OF THE DRAWINGS

In the accompanying drawings:

FIG. 4 is a diagram illustrating correspondence information stored in a memory of the image processing apparatus of FIG. 1;

DETAILED DESCRIPTION

Hereinafter, embodiments of the present disclosure will be described with reference to the drawings.

A camera monitor system 10 according to an embodiment of the present disclosure will be described with reference to FIG. 1.

Figure 1:
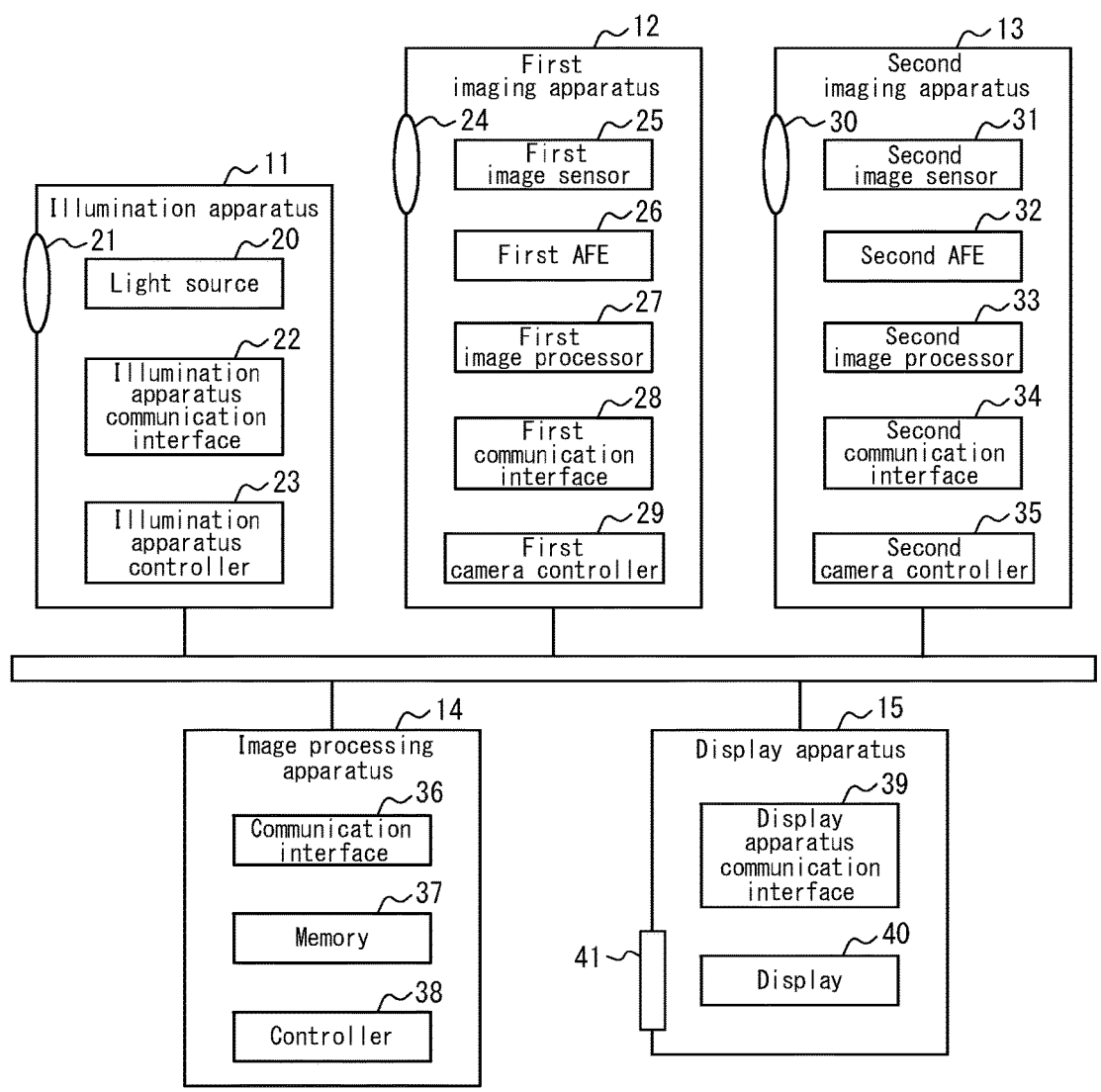
FIG. 1 is a block diagram schematically illustrating a configuration of a camera monitor system according to an embodiment of the present disclosure.

As illustrated in FIG. 1, the camera monitor system 10 includes an illumination apparatus 11, a first imaging apparatus 12, one or more second imaging apparatuses 13, an image processing apparatus 14, and one or more display apparatuses 15. In FIG. 1, one second imaging apparatus 13 is illustrated by way of example. In FIG. 1, also, one display apparatus 15 is illustrated by way of example. Each constituent element of the camera monitor system 10 may transmit and receive information via a network 16. The network 16 may be, for example, a radio network, a wired network, or a CAN (Controller Area Network). In some embodiments, some or all of the constituent elements of the camera monitor system 10 may be integrally configured as a single apparatus. For example, the image processing apparatus 14 and the first imaging apparatus 12 may be incorporated in the display apparatus 15. In some embodiments, the camera monitor system 10 may include the first imaging apparatus 12, the second imaging apparatus 13, the image processing apparatus 14, and the display apparatus 15. In this case, the illumination apparatus 11 may be provided separately from the camera monitor system 10. In some embodiments, the camera monitor system 10 may include the image processing apparatus 14 and the display apparatus 15. In this case, the illumination apparatus 11, the first imaging apparatus 12, and the second imaging apparatus 13 may be provided separately from the camera monitor system 10.

Figure 2:
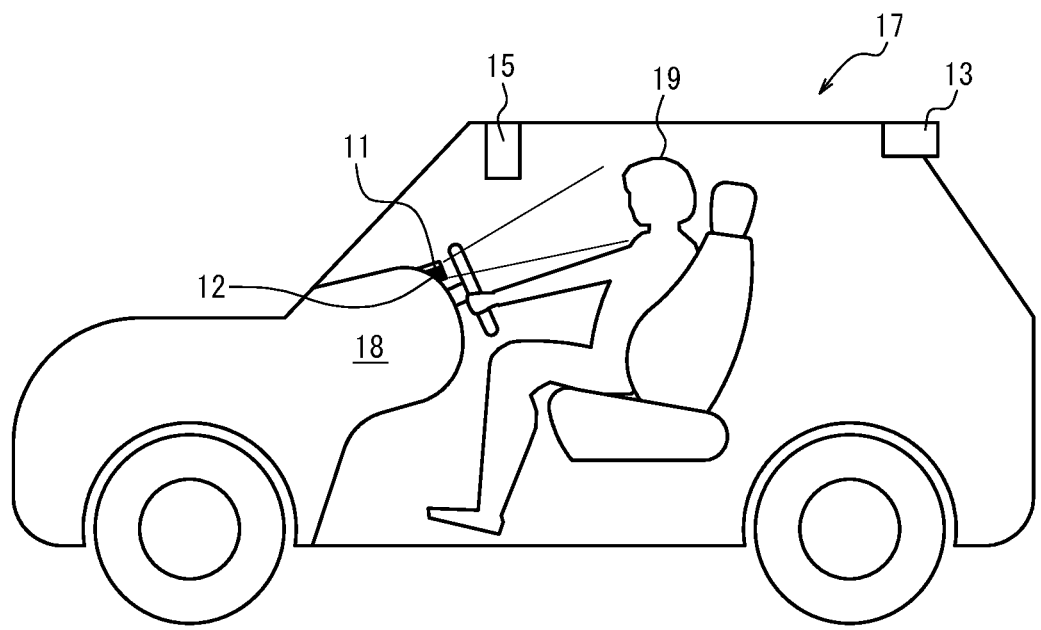
FIG. 2 is a diagram illustrating a vehicle equipped with the camera monitor system of FIG. 1 viewed from a left side.
Figure 3:
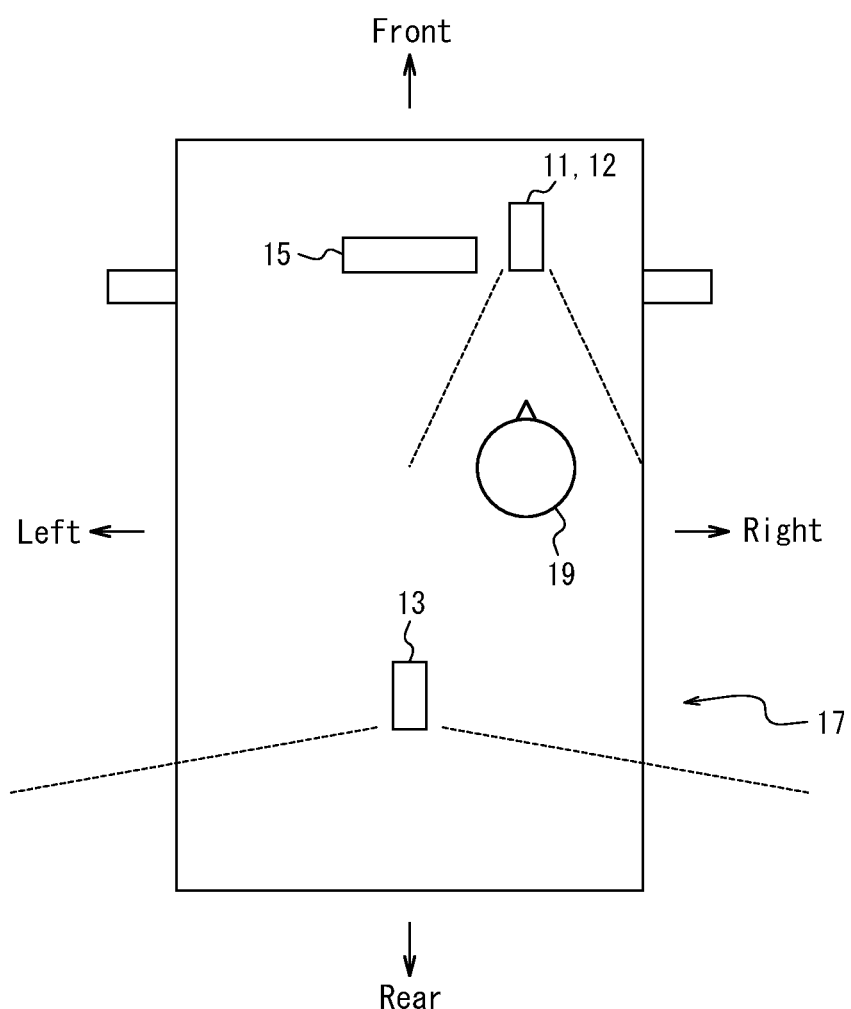
FIG. 3 is a diagram illustrating the vehicle equipped with the camera monitor system of FIG. 1 viewed from above.

The illumination apparatus 11 may be disposed at any position from which the illumination apparatus 11 is able to emit light to the face of a subject 19. The subject 19 may include, for example, a driver of a vehicle 17. As illustrated in FIG. 2 and FIG. 3, the illumination apparatus 11 may be disposed, for example, on a dashboard 18 of the vehicle 17. The first imaging apparatus 12 may be disposed at any position from which the first imaging apparatus 12 is able to capture the face of the subject 19 illuminated by light from the illumination apparatus 11. The first imaging apparatus 12 may be disposed, for example, on the dashboard 18 of the vehicle 17. According to the present embodiment, the first imaging apparatus 12 generates a captured image in which the pupil of the eye of the subject 19 is brightly illuminated. Hereinafter, the captured image with a brightly illuminated pupil will also be referred to as a bright-pupil image. For example, the illumination apparatus 11 and the first imaging apparatus 12 are disposed close to each other such that the first imaging apparatus 12 generates the bright-pupil image. In some embodiments, the first imaging apparatus 12 may generate a captured image in which the pupil is dark. Hereinafter, the captured image with a dark pupil will also be referred to as a dark-pupil image. For example, the illumination apparatus 11 and the first imaging apparatus 12 may be disposed remote from each other such that the first imaging apparatus 12 generates the dark-pupil image. Hereinafter, the captured image captured by the first imaging apparatus 12 will also be referred to as a first captured image.

Figure 12:
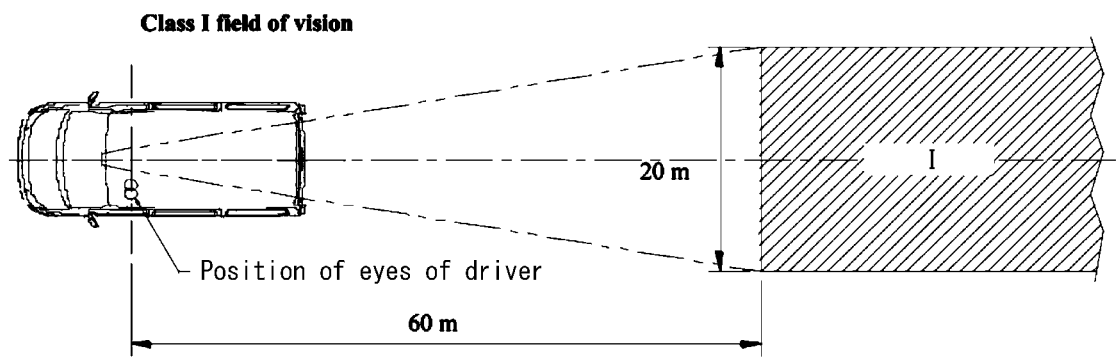
FIG. 12 is a diagram illustrating Class I field of vision.
Figure 13:
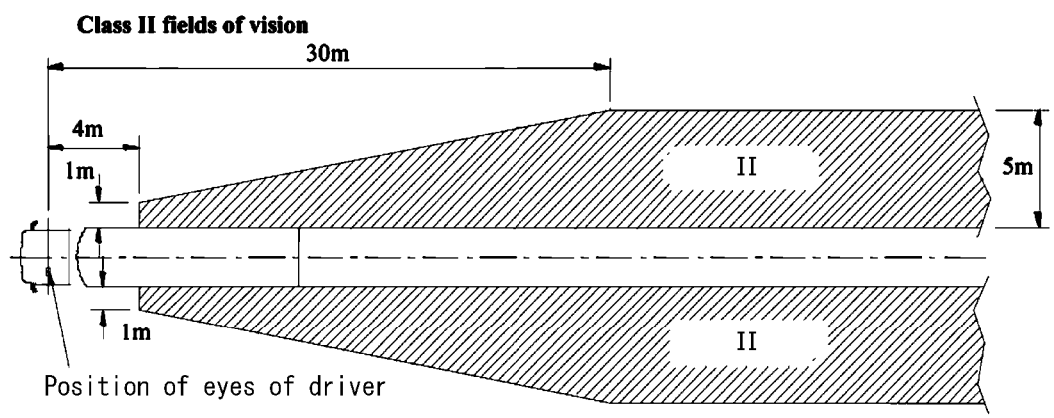
FIG. 13 is a diagram illustrating Class II field of vision.
Figure 14:
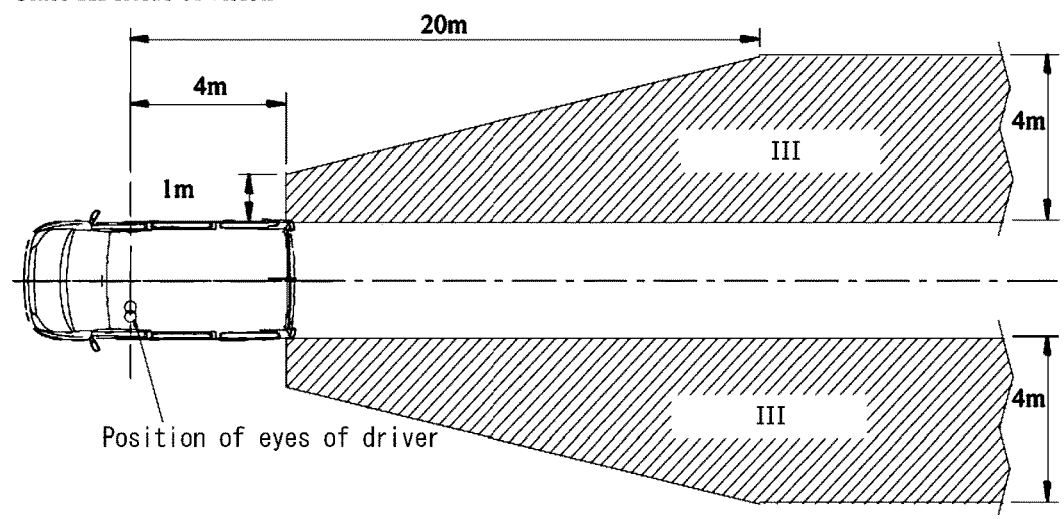
FIG. 14 is a diagram illustrating Class III field of vision.
Figure 15:
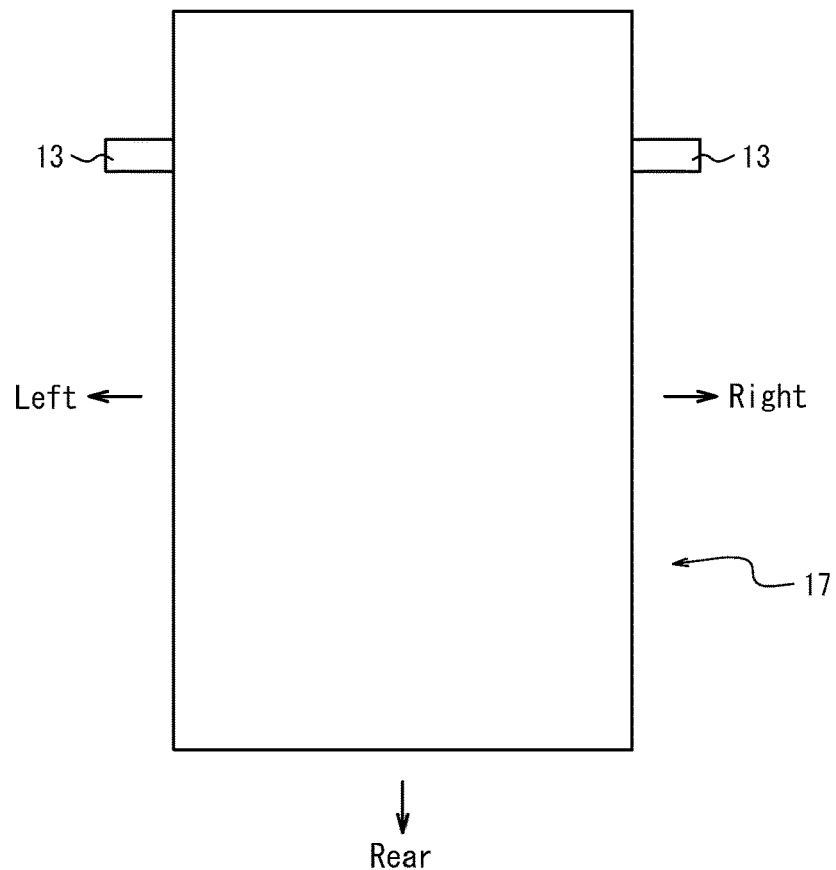
FIG. 15 is a diagram illustrating a vehicle having a camera monitor system according to a further embodiment of the present disclosure viewed from above the vehicle.

The second imaging apparatus 13 includes a wide-angle lens. The wide-angle lens may be, for example, a fisheye lens. The second imaging apparatus 13 may be disposed at any position where the second imaging apparatus 13 may capture a predetermined area outside the vehicle 17. The predetermined area may include, for example, at least one of the Class I to III fields of vision described in Regulation No. 46, No. 15 "Requirements" of UNECE (United Nations Economic Commission for Europe). Hereinafter, the Class I-III fields of vision will also be referred to simply as Class I-III. The hatched area I in FIG. 12 represents Class I. The hatched area II in FIG. 13 represents Class II. The hatched area III in FIG. 14 represents Class III. In the present embodiment, one second imaging apparatus 13 may be disposed on a rear side of the vehicle 17 as illustrated in FIG. 2 by way of example. In some embodiments, two second imaging apparatus 13 may be disposed on the left and right sides of the vehicle 17 as illustrated in FIG. 15 by way of example. In some embodiments, the predetermined area may include all Class I, Class II, and Class III. The second imaging apparatus 13 generates a captured image capturing the predetermined area described above. Hereinafter, the captured image of the second imaging apparatus 13 will also be referred to as a second captured image.

Figure 16:
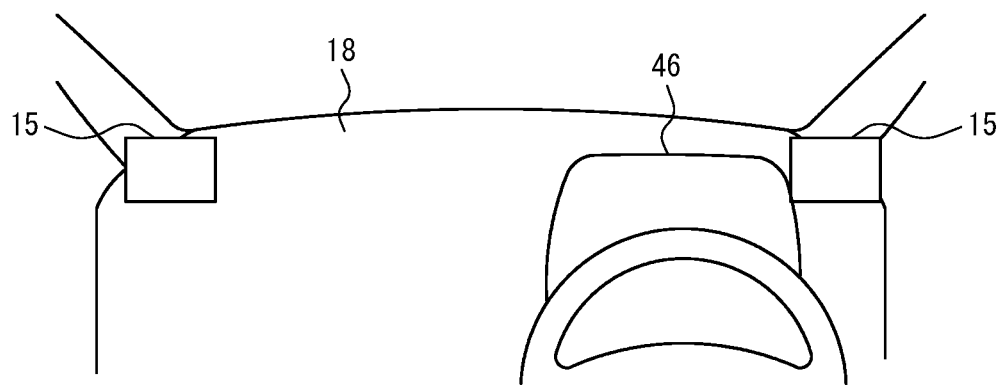
FIG. 16 is a diagram illustrating a first example of positions of two display apparatuses of the camera monitor system according to the further embodiment of the present disclosure.
Figure 17:
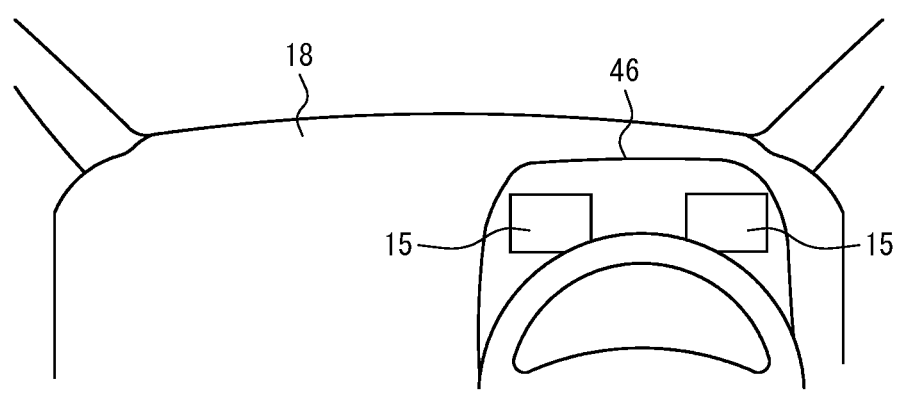
FIG. 17 is a diagram illustrating a second example of the positions of the two display apparatuses of the camera monitor system according to the further embodiment of the present disclosure.

The display apparatus 15 is disposed at a position viewable by the subject 19 on a driver seat. In the present embodiment, the display apparatus 15 may be disposed, as illustrated in FIG. 2 by way of example, in place of a conventional rearview mirror and at a position where the conventional rearview mirror would normally be disposed in the vehicle 17. In some embodiments, in the vehicle 17 one display apparatus 15 corresponding to the second imaging apparatus 13 may be disposed on the left side of the vehicle 17 and another display apparatus 15 corresponding to the second imaging apparatus 13 may be disposed on the right side of the vehicle 17. As illustrated in FIG. 16, two display apparatuses 15 may be disposed on the dashboard 18 of the vehicle 17. For example, one of the display apparatuses 15 may be disposed on the left side on the dashboard 18, and the other display apparatus 15 may be disposed on the right side on the dashboard 18. As illustrated in FIG. 17, the two display apparatuses 15 may be disposed on an instrument panel 46. For example, one of the display apparatuses 15 may be disposed on the left side on the instrument panel 46, and the other display apparatus 15 may be disposed on the right side on the instrument panel 46. As will be described later, the display apparatus 15 may be an electronic mirror configured to interchangeably function as a mirror and a display. As will be described later, when functioning as the display, the display apparatus 15 displays a partial region of the second captured image of the second imaging apparatus 13. Hereinafter, the partial region of the second captured image will also be referred to as a specific region. For example, when the display apparatus 15 functions as the mirror, in some instances a field of view of the subject 19 may be blocked by an obstacle placed on the rear seat. In this case, the subject 19 may view a partial area outside the vehicle 17 on the display apparatus 15 by switching the function of the display apparatus 15 to the display from the mirror.

Each constituent element of the camera monitor system 10 will now be described.

The first imaging apparatus 12 will be described. As illustrated in FIG. 1, the first imaging apparatus 12 includes a first imaging optical system 24, a first image sensor 25, a first AFE (Analog Front End) 26, a first image processor 27, a first communication interface 28, and a first camera controller 29.

The first imaging optical system 24 includes a diaphragm and one or more lenses. The first imaging optical system 24 forms a subject image of the light passing therethrough. The first imaging optical system 24 passes at least light in a predetermined wavelength band. The predetermined wavelength band may include a wavelength band of the light emitted from the illumination apparatus 11 as described later. For example, when the light emitted from the illumination apparatus 11 includes an infrared light, the predetermined wavelength band may include the wavelength of the infrared light. In the present embodiment, the first imaging optical system 24 may further include a filter that passes only light in the predetermined wavelength band. The first imaging optical system 24 is disposed at any position where the first imaging optical system 24 may capture light reflected on an illumination target of the light emitted from the illumination apparatus 11 as described later. In the present embodiment, the first imaging optical system 24 may form the subject image including the face of the subject 19 illuminated by the light from the illumination apparatus 11. In the present embodiment, the first imaging optical system 24 may be disposed in the vicinity of an illumination optical system 21 of the illumination apparatus 11 described later. In some embodiments, the first imaging optical system 24 may be disposed remote from the illumination optical system 21 of the illumination apparatus 11.

The first image sensor 25 includes, for example, a CCD (Charge Coupled Device) image sensor or a CMOS (Complementary Metal Oxide Semiconductor) image sensor. The first image sensor 25 generates the first captured image by capturing the subject image formed by the first imaging optical system 24. When the first image sensor 25 is configured as a CMOS image sensor, functions of the first AFE 26 may be borne by the first image sensor 25.

The first AFE 26 includes, for example, CDS (Correlated Double Sampling), AGC (Auto Gain Control), and an ADC (Analog-to-Digital Converter). The first AFE 26 performs predetermined upstream image processing such as the CDS, gain adjustment, and A/D conversion on the first captured image, which is an analog image generated by the first image sensor 25.

The first image processor 27 includes a processor such as DSP (Digital Signal Processor) specialized for the image processing. The first image processor 27 performs predetermined downstream image processing such as exposure adjustment on the first captured image subjected to the predetermined upstream image processing.

The first communication interface 28 includes an interface configured to input and output information via the network 16.

The first camera controller 29 includes, for example, a specialized microprocessor or a general-purpose CPU configured to perform a particular function by reading a specific program. The first camera controller 29 controls overall operation of the first imaging apparatus 12. For example, the first camera controller 29 generates a synchronization signal that indicates the timing of imaging and causes the first communication interface 28 to output the synchronization signal to the illumination apparatus 11. Upon output of the synchronization signal, the first camera controller 29 causes the first image sensor 25 to capture the subject image. The first camera controller 29 controls the first image processor 27 and the first communication interface 28 such that the first captured image subjected to the predetermined downstream image processing is output to the image processing apparatus 14 via the network 16. In some embodiments, the synchronization signal may be generated by a constituent component of the camera monitor system 10 other than the first imaging apparatus 12. For example, the synchronization signal may be generated by the illumination apparatus 11, the second imaging apparatus 13, the image processing apparatus 14, or the display apparatus 15. The synchronization signal thus generated may be input to the first imaging apparatus 12 and the illumination apparatus 11.

The illumination apparatus 11 will be described. The illumination apparatus 11 includes one or more light sources 20, an illumination optical system 21, an illumination apparatus communication interface 22, and an illumination apparatus controller 23.

The light source 20 includes, for example, an LED. The light source 20 emits at least the light in the predetermined wavelength band. The light in the predetermined wavelength band may pass through the first imaging optical system 24 of the first imaging apparatus 12. In the present embodiment, the light source 20 may be an infrared LED that emits diffused light in the infrared band.

The illumination optical system 21 includes, for example, a lens with an adjusted view angle. The illumination optical system 21 emits the light that passes through the illumination optical system 21. In the present embodiment, the light from the light source 20 having passed through the illumination optical system 21 illuminates the entire face of the subject 19.

The illumination apparatus communication interface 22 includes an interface configured to input and output information via the network 16. Hereinafter, input of information will be also referred to as acquisition or reception of information.

The illumination apparatus controller 23 includes a specialized microprocessor or a general-purpose CPU (Central Processing Unit) configured to perform a particular function by reading a specific program. The illumination apparatus controller 23 controls operation of each constituent element of the illumination apparatus 11. For example, the illumination apparatus controller 23 causes the light source 20 to emit the light in synchronization with the imaging by the first imaging apparatus 12. In the present embodiment, the illumination apparatus controller 23 causes the light source 20 to perform periodical pulse emission of the light of the infrared band for a predetermined time period in accordance with the synchronization signal acquired via the illumination apparatus communication interface 22. As described above, the first imaging apparatus 12 generates the captured image in accordance with the synchronization signal. Accordingly, the timing of light emission by the illumination apparatus 11 and the timing of the imaging by the first imaging apparatus 12 are synchronized.

The second imaging apparatus 13 will be described. The second imaging apparatus 13 includes a second imaging optical system 30, a second image sensor 31, a second AFE 32, a second image processor 33, a second communication interface 34, and a second camera controller 35.

The second imaging optical system 30 includes a diaphragm and one or more lenses. The second imaging optical system 30 forms the subject image. In the present embodiment, the second imaging optical system 30 has a wide angle and is capable of forming the subject image of a particular area outside the vehicle 17 as described above.

The second image sensor 31 includes, for example, the CCD image sensor or the CMOS image sensor. The second image sensor 31 generates the second captured image by capturing the subject image formed by the second imaging optical system 30. When the second image sensor 31 is the CMOS image sensor, functions of the second AFE 32 may be borne by the second image sensor 31. The second image sensor 31 will also be referred to as an imaging unit.

The second AFE 32 includes, for example, CDS, AGC, and an ADC. The second APE 32 performs predetermined upstream image processing such as the CDS, the gain adjustment, and the A/D conversion on the second captured image, which is an analog image generated by the second image sensor 31.

The second image processor 33 includes, for example, a processor such as DSP specialized for the image processing. The second image processor 33 performs predetermined downstream image processing such as white balance adjustment and exposure adjustment on the second captured image subjected to the predetermined upstream image processing by the second AFE 32. In the present embodiment, the predetermined downstream image processing includes horizontal inversion processing to invert the second image between the left side and the right side. Accordingly, for example, an object positioned on the left side behind the vehicle 17 is captured on the left side in the second image. This enables, when the second captured image is displayed on the display apparatus 15 as described later, the subject 19 to view the rear periphery of the vehicle 17 in a manner similar to an actual rearview mirror.

The second communication interface 34 includes an interface configured to input and output information via the network 16.

The second camera controller 35 includes, for example, a specialized microprocessor or a general-purpose CPU (Central Processing Unit) configured to perform a particular function by reading a specific program. The second camera controller 35 controls overall operation of the second imaging apparatus 13. For example, the second camera controller 35 causes the second image sensor 31 to capture the subject image periodically, e.g., at 30 fps (frames per second). The second camera controller 35 controls the second image processor 33 and the second communication interface 34 such that the second captured image subjected to the predetermined downstream image processing is output to the image processing apparatus 14 via the network 16.

The image processing apparatus 14 will be described. The image processing apparatus 14 includes a communication interface 36, a memory 37, and a controller 38.

The communication interface 36 includes an interface configured to input and output information via the network 16.

The memory 37 stores various information and programs necessary for the operation of the image processing apparatus 14. For example, the memory 37 stores in advance a variety of combinations of at least one of a first parameter indicating a position of the face of the subject 19 detected in the first captured image, a second parameter indicating an orientation of the face, and a third parameter indicating a size of the face, and a fourth parameter indicating a position of the pupil or the iris in the eye in in the first captured image. The memory 37 stores, in advance, correspondence information that includes first information indicating at least one of the position and the orientation of the face of the subject 19 in the vehicle 17 and second information indicating whether the line-of-sight of the subject 19 is directed to the display apparatus 15, in association with the various combinations. The first information indicating the position and the orientation of the face of the subject 19 in the vehicle 17 may be, but is not limited to, a coordinate and a direction vector indicating the position of the face of the subject 19 in the vehicle 17. The correspondence information may be stored, for example, as a look-up table as illustrated in FIG. 4. The correspondence information may be created in advance by performing an experiment or a simulation on the basis of a positional relationship between the first imaging apparatus 12 and the display apparatus 15 disposed in the vehicle 17.

As described later, the correspondence information is used by the controller 38 to determine at least one of the position and the orientation of the face of the subject 19 in the vehicle 17, and also determine the direction of the line-of-sight of the subject 19.

The controller 38 includes, for example, a specialized microprocessor or a general-purpose CPU configured to perform a particular function by reading a specific program. The controller 38 controls overall operation of the image processing apparatus 14.

For example, the controller 38 causes the communication interface 36 to receive the first captured image from the first imaging apparatus 12 and receive the second captured image from the second imaging apparatus 13.

The controller 38 detects the face and the eye of the subject 19 in the first captured image. For the detection of the face and the eye, any technique such as a technique which uses pattern matching or a technique which extracts feature points in the first captured image may be employed. The feature points include, for example, points in the image corresponding to a facial contour, eyes, nose, and mouth.

The controller 38 determines the first to fourth parameters of the driver detected in the first captured image.

For the determination of the first parameter indicating the position of the face in the first captured image, a technique to detect the facial contour of the subject 19 in the first captured image and determine a position of the facial contour in the first captured image thus detected may be employed, for example.

For the determination of the second parameter indicating the orientation of the face in the first captured image, a technique to detect the facial contour and the nose of the subject 19 in the first captured image and determine the orientation of the face on the basis of a relative positional relationship between the facial contour and the nose in the first captured image may be employed, for example.

For the determination of the third parameter indicating the size of the face in the first captured image, a technique to detect the facial contour of the subject 19 in the first captured image and determine the size of the facial contour in the first captured image may be employed, for example.

For the determination of the fourth parameter indicating the position of the pupil or the iris in the eye in the first captured image, a technique to detect the eye and the pupil of the subject 19 in the first captured image and determine the position of the pupil or the iris in the eye in the first captured image may be employed, for example.

The controller 38 compares the combination of one of the first to third parameters and the fourth parameter with the correspondence information stored in advance. The controller 38 determines at least one of the position and the orientation of the face of the subject 19 in the vehicle 17 and whether the line-of-sight of the subject 19 is directed to the display apparatus 15, on the basis of a result of the comparison.

The controller 38 stores the first to fourth parameters and a result of the determination in the memory 37 in association with a current frame of the first captured image. In the present embodiment, the result of the determination includes information indicating the position and the orientation of the face of the subject 19 in the vehicle 17 and information indicating whether the line-of-sight of the subject 19 is directed to the display apparatus 15.

The controller 38 determines whether the result of the determination associated with the current frame indicates that the line-of-sight of the subject 19 is directed to the display apparatus 15.

When the result of the determination associated with the current frame indicates that the line-of-sight of the subject 19 is not directed to the display apparatus 15, the controller 38 sets a position and a size of the specific region in the second captured image to their respective predetermined values. The predetermined values may also be referred to as standard values. The standard values may be any values. Alternatively, the controller 38 may maintain the position and the size of the specific region in the second captured image in a past frame. The past frame may be, but not limited to, an immediately preceding frame. Processing for maintaining the position and the size of the specific region may include processing for stopping the change in the position and the size of the specific region. The controller 38 causes the communication interface 36 to output an image of the specific region clipped from the second captured image to the display apparatus 15.

On the other hand, when the result of the determination associated with the current frame indicates that the line-of-sight of the subject 19 is directed to the display apparatus 15, the controller 38 determines whether the result of the determination associated with the past frame indicates that the line-of-sight of the subject 19 is directed to the display apparatus 15.

When the result of the determination associated with the past frame indicates that the line-of-sight of the subject 19 is directed to the display apparatus 15, the controller 38 changes at least one of the position and the size of the specific region in the second captured image, according to a change in at least one of the position and the orientation of the face of the subject 19 in the vehicle 17 from past frame to the current frame. The operation of the controller 38 to change at least one of the position and the size of the specific region will be described in detail later.

The controller 38 causes the communication interface 36 to output the image of the specific region clipped from the second captured image to the display apparatus 15.

Now, the display apparatus 15 will be described. The display apparatus 15 includes a display apparatus communication interface 39, a display 40, and an optical member 41.

The display apparatus communication interface 39 includes an interface configured to input and output information via the network 16.

The display 40 includes a display such as a liquid crystal display or an organic EL (Electroluminescence) display. The display 40 may display, for example, an image received by the display apparatus communication interface 39. The display 40 is disposed in a housing of the display apparatus 15, which opens toward a cabin of the vehicle, in such a manner that backlight from the display 40 or light from the display 40 is irradiated to the cabin. The display 40 is configured to allow switchover between on and off of its operation in accordance with, for example, predetermined operation by the subject 19 in respect of the display apparatus 15.

The optical member 41 includes a member such as a half mirror configured to function as a beam splitter. The optical member 41 reflects a portion of incident light to the optical member 41 and transmits the rest of the incident light. The optical member 41 is panel-shaped and disposed in front of the display 40 provided to the housing of the display apparatus 15 in such a manner as to, for example, cover the opening of the housing. Thus, when the operation of the display 40 is turned off, i.e., when the display 40 does not emit light, the display apparatus 15 functions as a mirror for reflecting ambient light by means of the optical member 41. On the other hand, when the operation of the display 40 is turned on, i.e., when the display 40 emits light, the portion of the light from the display 40 transmitted by the optical member 41 is irradiated to the cabin. At this time, the display apparatus 15 functions as a display.

The operation of the controller 38 of the image processing apparatus 14 to change at least one of the position and the size of the specific region will be described in detail. As described above, when the result of the determination associated with the current frame and the result of the determination associated with the past frame both indicate that the line-of-sight of the subject 19 is directed to the display apparatus 15, the controller 38 changes at least one of the position and the size of the specific region. In particular, the controller 38 changes at least one of the position and the size of the specific region, according to at least one of the position and the orientation of the face of the subject 19 in the vehicle 17. Thus, when, for example, at least one of the position and the orientation of the face of the subject 19 in the vehicle 17 changes while the line-of-sight of the subject 19 is maintained directed to the display apparatus 15, at least one of the position and the size of the specific region changes. Hereinafter, at least one of the position and the orientation of the face of the subject 19 in the vehicle 17 will also be referred to as a "posture" of the subject 19. The "posture" does not include the line-of-sight of the subject 19. Thus, the subject 19 may, for example, change the line-of-sight in any manner while maintaining one posture. An example in which the subject 19 changes his/her posture while maintaining the line-of-sight directed to the display apparatus 15 will be described with reference to FIG. 5 to FIG. 10.

A state in which the subject 19 in the vehicle 17 is in a predetermined standard posture will be described. The standard posture is a posture of the subject 19 in which the subject 19 driving the vehicle 17 is seated on the driver's seat in a normal manner. The standard posture is determined for each subject 19 by, for example, performing calibration during initial operation of the camera monitor system 10. Hereinafter, a position and an orientation of the face in the standard posture of the subject 19 in the vehicle 17 will be referred to as a standard position and a standard orientation, respectively. The standard orientation substantially coincides with, for example, the forward direction of the vehicle 17.

Figure 5:
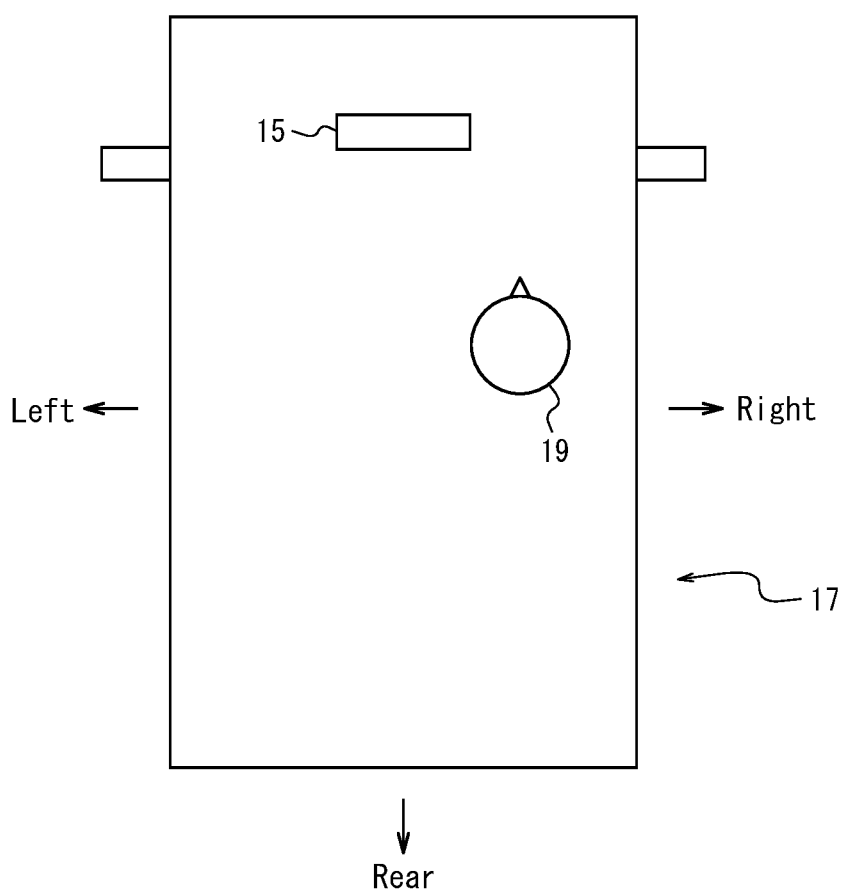
FIG. 5 is a diagram illustrating a state in which a face of a subject is in a standard position viewed from above the vehicle.
Figure 6:
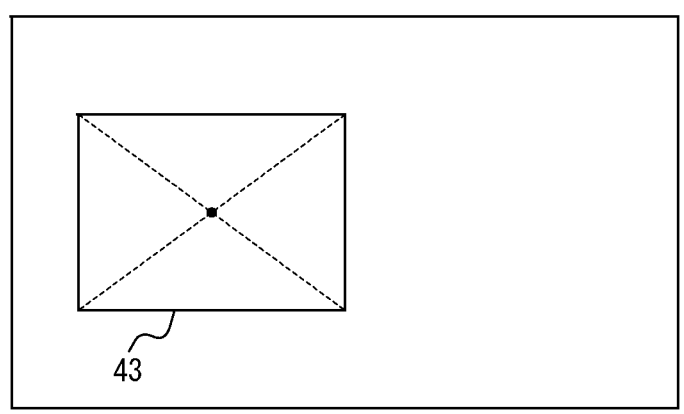
FIG. 6 is a diagram illustrating a specific region in a second captured image for the scenario illustrated in FIG. 5.

FIG. 5 illustrates, by way of example, a positional relationship between the subject 19 in the standard posture and the display apparatus 15. In this case, as illustrated in FIG. 6 by way of example, a position and a size of a specific region 43 in the second captured image 42 are set to their respective standard values.

Figure 7:
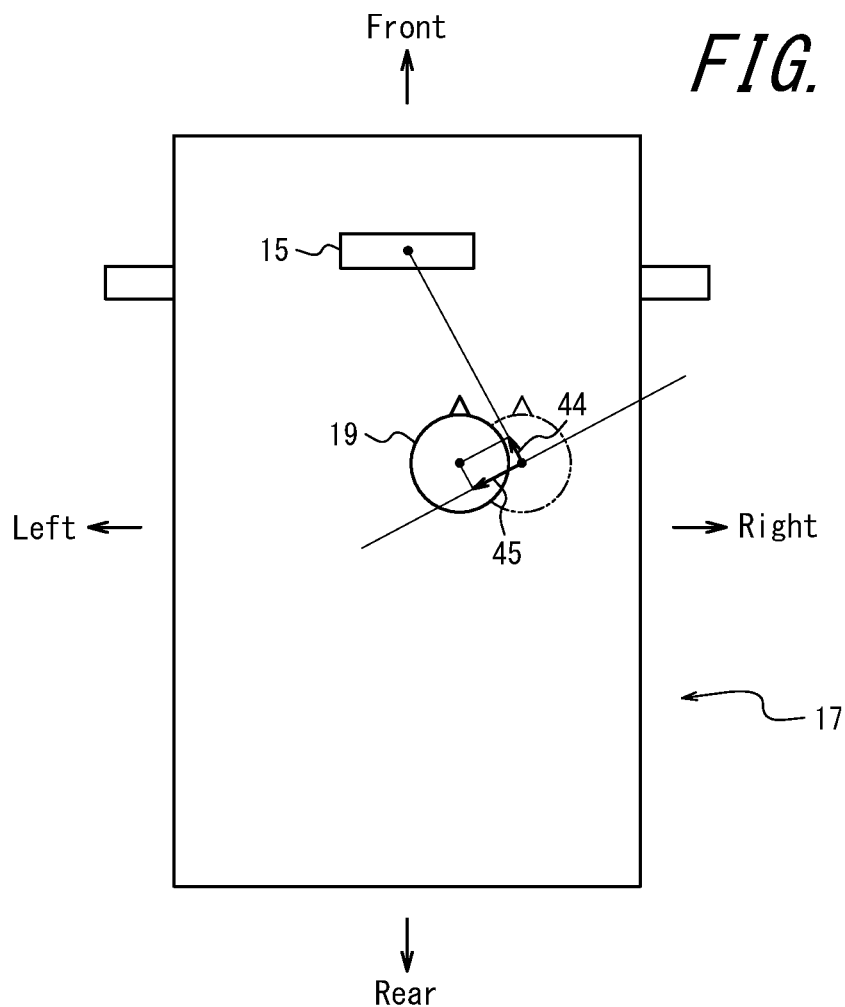
FIG. 7 is a diagram illustrating a state in which the position of the face of the subject is changed from the standard position viewed from above the vehicle.

A case in which the position of the face of the subject 19 in the vehicle 17 moves will now be described. The movement of the position of the face will also be referred to as a positional change of the face. The orientation of the face of the subject 19 is assumed to be maintained in the standard orientation. That is, the face of the subject 19 is directed in the forward direction. FIG. 7 illustrates, by way of example, a state in which the face of the subject 19 moves to the left from the standard position with respect to the forward direction. In this case, the positional change of the face of the subject 19 includes a first direction component 44 from the face of the subject 19 towards the display apparatus 15 and a second direction component 45 perpendicular to the first direction.

Figure 8:
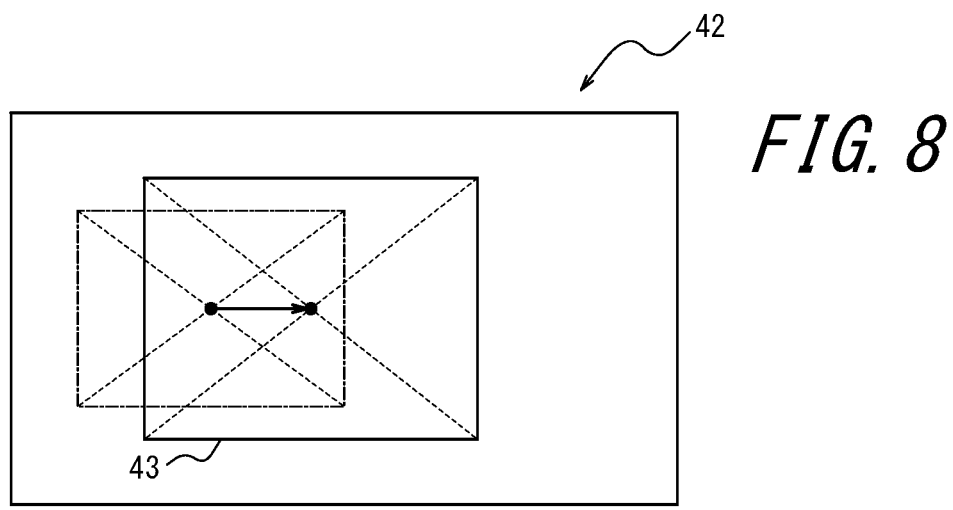
FIG. 8 is a diagram illustrating a specific region in the second captured image for the scenario illustrated in FIG. 7.

When the change of the position of the face of the subject 19 includes the first direction component 44, the controller 38 increases or decreases the size of the specific region 43. When the first direction component 44 is positive, i.e., when the face of the subject 19 moves towards the display apparatus 15, the controller 38 may increase the size of the specific region 43 as illustrated in FIG. 8 by way of example. This configuration enables the subject 19 to view a rear peripheral area of the vehicle 17 in the manner similar to an actual mirror.

When the positional change of the face of the subject 19 includes the second direction component 45, the controller 38 changes the position of the specific region 43 in a direction substantially the same as, or substantially opposite to, the second direction. The controller 38 may change the position of the specific region 43 in the direction substantially opposite to the second direction. For example, when the second direction corresponds to the left direction, the controller 38 changes the position of the specific region 43 in the right direction substantially opposite to the left direction as illustrated in FIG. 8. This configuration enables the subject 19 to view the rear peripheral area of the vehicle 17 in the manner similar to an actual mirror.

Figure 9:
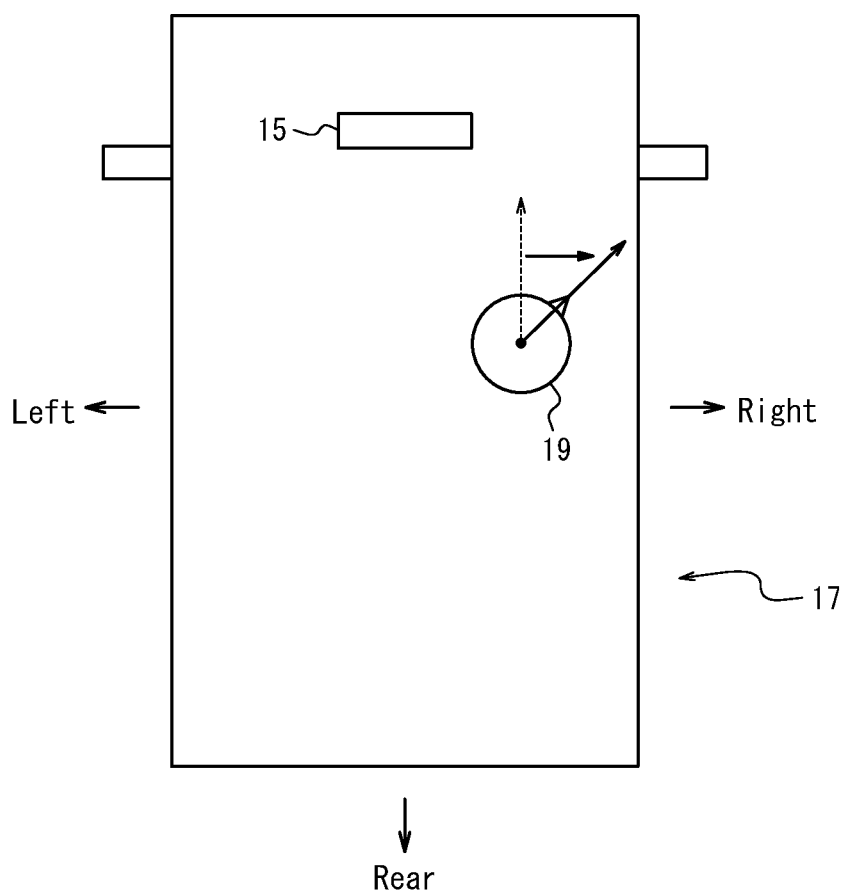
FIG. 9 is a diagram illustrating a state in which an orientation of the face of the subject is changed from a standard direction viewed from above the vehicle.
Figure 10:
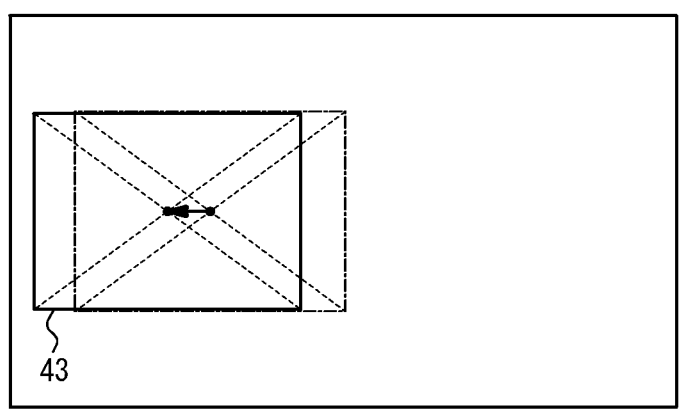
FIG. 10 is a diagram illustrating a specific region in the second captured image for the scenario illustrated in FIG. 9.

A case where the orientation of the face of the subject 19 in the vehicle 17 changes, for example, in a third direction, which is any one of up, down, left, or right directions with respect to the front direction of the face will be described. The change of the orientation of the face in the third direction will also be referred to as rotation of the face in the third direction. For example, FIG. 9 illustrates a state in which the orientation of the face of the subject 19 changes in the right direction with respect to the front direction of the face. That is, FIG. 9 illustrates a state in which the face of the subject 19 turns in the right direction. In this case, the controller 38 changes the position of the specific region 43 in the direction substantially the same as, or substantially opposite to, the third direction. The controller 38 may change the position of the specific region 43 in the direction substantially opposite to the third direction. For example, when the third direction corresponds to the right direction, the controller 38 changes the position of the specific region 43 in the left direction as illustrated in FIG. 10. This configuration enables the subject 19 to view the rear peripheral area of the vehicle 17 in the manner similar to an actual mirror.

Alternatively, when the orientation of the face of the subject 19 in the vehicle 17 is different from a predetermined direction, the controller 38 may change the position of the specific region 43 in a direction substantially the same as a fourth direction, which is directed to the orientation of the face of the subject 19 from the predetermined direction, or in a direction substantially opposite to the fourth direction. The predetermined direction may be any direction including, for example, a standard direction corresponding to the forward direction of the vehicle 17 or a direction directed to the display apparatus 15 from the standard position. This configuration enables the subject 19 to change a region of the image displayed on the display apparatus 15 by changing the orientation of the face in the up, down, left, or right direction from the predetermined direction while maintaining the line-of-sight directed to the display apparatus 15.

Figure 11:
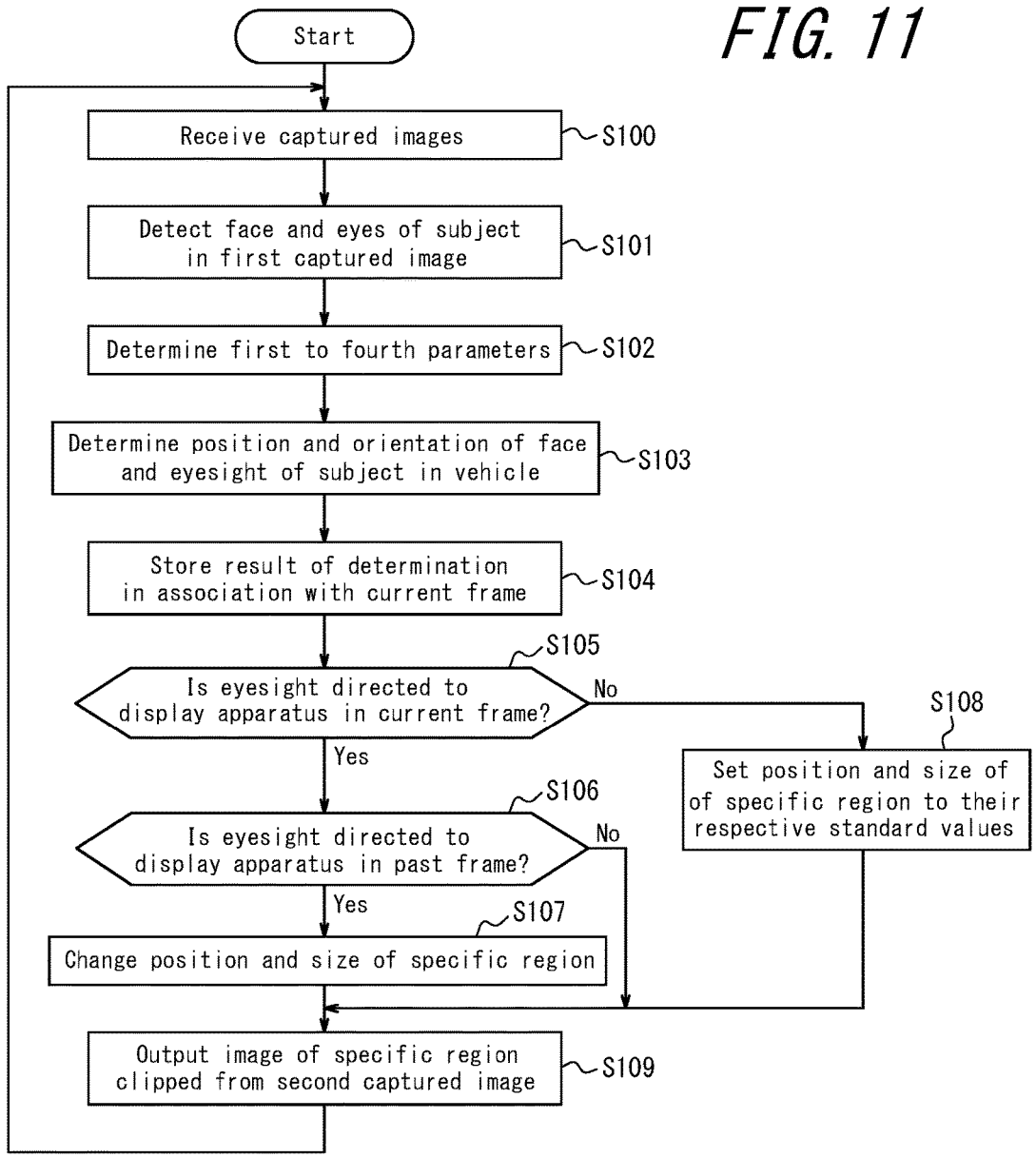
FIG. 11 is a flowchart illustrating operation of the image processing apparatus of FIG. 1.

The operation of the image processing apparatus 14 will be described with reference to the flowchart in FIG. 11. This operation starts when, for example, the operation of the display 40 of the display apparatus 15 is turned on, and is executed for each frame for generating the first captured image until the operation of the display 40 is turned off.

In step S100, the controller 38 causes the communication interface 36 to receive the first captured image from the first imaging apparatus 12 and receive the second captured image 42 from the second imaging apparatus 13.

In step S101, the controller 38 detects the face and the eyes of the subject 19 in the first captured image.

In step S102, the controller 38 determines the first to fourth parameters of the subject 19 detected in the first captured image.

In step S103, the controller 38 compares the determined combination of the first to fourth parameters with the correspondence information stored in advance and determines at least one of the position and the orientation of the face of the subject 19 in the vehicle 17 and also determines whether the line-of-sight of the subject 19 is directed to the display apparatus 15.

In step S104, the controller 38 stores the first to fourth parameters determined in step S102 and the result of the determination made in step S103, in association with the current frame of the first captured image.

In step S105, the controller 38 determines whether the result of the determination associated with the current frame indicates that the line-of-sight of the subject 19 is directed to the display apparatus 15. When the line-of-sight is directed to the display apparatus 15 (in the case of Yes in step S105), the controller 38 proceeds to step S106. On the other hand, when the line-of-sight is not directed to the display apparatus 15 (in the case of No in step S105), the controller 38 proceeds to step S108.

When the line-of-sight is directed to the display apparatus 15 in step S105 (in the case of Yes in step S105), the controller 38 determines in step S106 whether the result of the determination associated with a past frame indicates that the line-of-sight of the subject 19 is directed to the display apparatus 15. When the line-of-sight is directed to the display apparatus 15 (in the case of Yes in step S106), the controller 38 proceeds to step S107. On the other hand, when the line-of-sight is not directed to the display apparatus 15 (in the case of No in step S106), the controller 38 proceeds to step S109.

When the line-of-sight is directed to the display apparatus 15 in step S106 (in the case of Yes in step S106), the controller 38 changes at least one of the position and the size of the specific region 43 in the second captured image 42 in step S107, according to the change in at least one of the position and the orientation of the face of the subject 19 in the vehicle 17 from the past frame to the current frame. Then, the controller 38 proceeds to step S109.

When the line-of-sight is not directed to the display apparatus 15 in step S105 (in the case of No in step S105), the controller 38 sets the position and the size of the specific region 43 in the second captured image 42 to their respective predetermined values in step S108. Alternatively, the controller 38 may maintain (stops changing) the position and the size of the specific region 43 in the second captured image 42 in the past frame. Then, the controller 38 proceeds to step S109.

When the line-of-sight is not directed to the display apparatus 15 in step S106 (in the case of No in step S106), the controller 38 causes the communication interface 36 to output the image of the specific region 43 clipped from the second captured image 42 to the display apparatus 15 at step S109 after step S107 or S108. Then, the controller 38 returns to step S100.

As described above, the image processing apparatus 14 of the camera monitor system 10 according to the present embodiment changes at least one of the position and the size of the specific region 43, according to at least one of the position and the orientation of the face of the subject 19 as well as the direction of the line-of-sight of the subject 19. The position and the orientation of the face and the direction of the line-of-sight of the subject 19 are determined on the basis of the first captured image capturing the face of the subject 19. The image processing apparatus 14 improves usability of the camera monitor system 10 as described below.

According to conventional techniques, the impression a driver has when using the conventional configuration utilizing an actual mirror may differ to that of a configuration utilizing the camera monitor system. For example, in the configuration utilizing an actual mirror, a peripheral area around the vehicle viewable in the mirror changes in accordance with the posture of the driver in the vehicle. Accordingly, it can be acceptable in the camera monitor system, from the viewpoint of usability, to change the display of the display apparatus in accordance with the posture of the driver. However, when the driver is assumed to change his/her posture unconsciously and the display of the display apparatus is frequently changed in accordance with the change, the usability of the camera monitor system may be impaired. As such, there is room for improvement in the usability of the camera monitor system.

On the other hand, the image processing apparatus 14 having the above configuration may change the specific region 43 in the image displayed on the display apparatus 15 on the basis of the posture of the user in a manner similar to that when the user is looking at the peripheral area of the vehicle 17 in an actual mirror. Thus, the usability of the camera monitor system 10 may be improved.

When the line-of-sight of the subject 19 is directed to the display apparatus 15, the image processing apparatus 14 may change at least one of the position and the size of the specific region 43. This configuration changes the specific region 43 only when, for example, the subject 19 is highly likely to be looking at the display apparatus 15, thus further improving the usability of the camera monitor system 10.

When the positional change of the face of the subject 19 in the vehicle 17 includes the first direction component 44, the image processing apparatus 14 may increase or decrease the size of the specific region 43. This configuration enables the subject 19 to view the rear peripheral area of the vehicle 17 in the manner similar to an actual mirror, thus further improving the usability of the camera monitor system 10.

When the positional change of the face of the subject 19 in the vehicle 17 includes the second direction component 45, the image processing apparatus 14 may change the position of the specific region 43 in the direction substantially the same as, or substantially opposite to, the second direction. This configuration enables the subject 19 to view the rear peripheral area of the vehicle 17 in the manner similar to an actual mirror, thus further improving the usability of the camera monitor system 10.

The image processing apparatus 14 may change the position of the specific region 43 in a direction substantially the same as the third direction, in which the orientation of the face of the subject 19 in the vehicle is changed in the up, down, left, or right direction, or in the direction substantially opposite to the third direction. This configuration enables the subject 19 to view the rear peripheral area of the vehicle 17 in the manner similar to an actual mirror, thus further improving the usability of the camera monitor system 10.

Alternatively, when the orientation of the face of the subject 19 in the vehicle 17 is different from the predetermined direction, the image processing apparatus 14 may change the position of the specific region 43 in the direction substantially the same as the fourth direction, which directs to the orientation of the face of the subject 19 from the predetermined direction, or in the direction substantially opposite to the fourth direction. This configuration enables the subject 19 to successively change the specific region 43 in the image displayed on the display apparatus 15 by changing the orientation of the face in the up, down, left, and right directions from the predetermined direction while keeping the line-of-sight directed to the display apparatus 15. Thus, the usability of the camera monitor system 10 is further improved.

Although the present disclosure has been described on the basis of figures and embodiments, it should be appreciated that those who are skilled in the art may easily vary or alter in a multiple manner on the basis of the present disclosure. Accordingly, such variations and modifications are included in the scope of the present disclosure. For example, a function included in each means or each step may be rearranged avoiding a logical inconsistency, such that a plurality of means or steps are combined or divided.

For example, although in the above embodiments the image processing apparatus 14 is configured to receive the second captured image 42 from the second imaging apparatus 13, the reception of the second captured image may be omitted. In this case, the controller 38 of the image processing apparatus 14, after determining the position and the size of the specific region 43 in the second captured image 42, outputs information indicating the position and the size of the specific region 43 to the second imaging apparatus 13. The second camera controller 35 of the second imaging apparatus 13 determines the specific region 43 on the basis of the information received from the image processing apparatus 14 and outputs the image of the specific region 43 clipped from the second captured image 42 to the display apparatus 15. This configuration eliminates the necessity for the second imaging apparatus 13 to output the second captured image 42 to the image processing apparatus 14, thus reducing information communicated between the second imaging apparatus 13 and the image processing apparatus 14.

Although the camera monitor system 10 according to the above embodiments includes the illumination apparatus 11, the first imaging apparatus 12, the second imaging apparatus 13, the image processing apparatus 14, and the display apparatus 15, each constituent element and each function of the camera monitor system 10 may be rearranged. For example, some or all of the constituent elements and functions of the image processing apparatus 14 may be included in at least one of the first imaging apparatus 12 and the second imaging apparatus 13. The first camera controller 29 of the first imaging apparatus 12 may determine the position and the size of the specific region 43 in the second captured image 42 and output the information indicating the position and the size of the specific region 43 to the second imaging apparatus 13. The second camera controller 35 of the second imaging apparatus 13 determines the specific region 43 on the basis of the information received from the image processing apparatus 14 and outputs the image of the specific region 43 clipped from the second captured image 42 to the display apparatus 15.

In the above embodiments the image of the specific region 43 clipped from the second captured image 42 is displayed on the display apparatus 15. However, when the first imaging optical system 24 of the first imaging apparatus 12 omits a filter for transmitting only the light of the infrared band, that is, when the first imaging apparatus 12 is used as a visible light camera, the image of the specific region 43 clipped from the first captured image may be displayed on the display apparatus 15.

Although in the above embodiments the memory 37 of the image processing apparatus 14 stores the correspondence information in advance, the memory 37 does not need to store the correspondence information. In this case, the controller 38 of the image processing apparatus 14 determines the position and the orientation of the face of the subject 19 in the vehicle 17 and also determines whether the line-of-sight is directed to the display apparatus 15 by performing, for example, a simulation using the first to fourth parameters determined on the basis of the first captured image.

Some of the constituent elements of the camera monitor system 10 according to the above embodiments may be provided outside the vehicle 17. For example, the image processing apparatus 14 may be implemented by a communication device such as a mobile phone or an external server and connected to other constituent elements of the camera monitor system 10 in a wired or wireless manner.

The above embodiments describe a configuration in which the camera monitor system 10 is mounted in the vehicle 17. However, the camera monitor system 10 may be mounted in various moving bodies other than the vehicle 17. The term "moving body" used herein may encompass, for example, vehicles, ships, and aircrafts. The vehicles may include, for example, automobiles, industrial vehicles, rail vehicles, life vehicles, and fixed-wing aircrafts that travel on a runway. The automobiles may include, for example, cars, tracks, bases, motorcycles, and trolley buses. The industrial vehicles may include, for example, agricultural vehicles and construction vehicles. The industrial vehicles may include, for example, forklifts and golf carts. The industrial vehicles for agricultural purpose may include, for example, tractors, tillers, transplanters, binders, combined harvesters, and lawn mowers. The industrial vehicles for construction purpose may include, for example, bulldozers, scrapers, excavators, crane trucks, dump trucks, and load rollers. The vehicles may include human-power vehicles traveling on human power. Classification of the vehicles is not limited to the above. For example, the vehicles may include industrial vehicles authorized to travel on the road. A plurality of categories may include the same type of vehicles. The vessels may include, for example, watercrafts, boats, and tankers. The aircrafts may include, for example, fixed wing aircrafts and rotorcrafts.

The invention claimed is:

1. An image processing apparatus comprising:
a communication interface configured to receive a first captured image capturing a face of a subject in a moving body and to output an image of a specific region, which is clipped from either the first captured image or a second captured image different from the first captured image, to a display apparatus mounted in the moving body; and
a controller configured to
determine a direction of a line-of-sight of the subject and at least one of a position and an orientation of the face of the subject based on the first captured image, and
change, as the specific region appears in the display apparatus, at least one of a position and a size of the specific region based on the determined direction of a line-of-sight of the subject and at least one of a position and an orientation of the face of the subject.

2. The image processing apparatus according to claim 1, wherein, when the line-of-sight of the subject is directed to the display apparatus mounted in the moving body, the controller changes at least one of the position and the size of the specific region.

3. The image processing apparatus according to claim 1, wherein, when the line-of-sight of the subject is not directed to the display apparatus mounted in the moving body, the controller stops changing the position and the size of the specific region or sets the position and the size of the specific region to respective standard values.

4. The image processing apparatus according to claim 1, wherein, when a positional change of the face of the subject in the moving body includes a first direction component from the face of the subject toward the display apparatus mounted in the moving body, the controller increases or decreases the size of the specific region.

5. The image processing apparatus according to claim 1, wherein, when a positional change of the face of the subject in the moving body includes a second direction component in a second direction perpendicular to a first direction component from the face of the subject toward the display apparatus mounted in the moving body, the controller changes the position of the specific region in a direction substantially the same as, or substantially opposite to, the second direction.

6. The image processing apparatus according to claim 1, wherein the controller changes the position of the specific region in a direction substantially the same as, or substantially opposite to, a third direction in which the orientation of the face of the subject in the moving body is changed in an up, a down, left, or right direction with respect to a front direction of the face.

7. The image processing apparatus according to claim 1, wherein, when the orientation of the face of the subject in the moving body is different from a predetermined direction, the controller changes the position of the specific region in a direction substantially the same as, or substantially opposite to, a fourth direction directed to the orientation of the face of the subject from the predetermined direction.

8. The image processing apparatus according to claim 1, wherein the second captured image is a captured image capturing an area outside the moving body.

9. An imaging apparatus comprising:
a camera configured to generate a captured image capturing an area outside a moving body;
a communication interface configured to acquire information indicating at least one of a position and an orientation of a face of a subject in the moving body, as well as a direction of a line-of-sight of the subject, and to output an image of a specific region, which is clipped from either the captured image, to a display apparatus mounted in the moving body; and
a controller configured to change, as the specific region appears in the display apparatus, at least one of a position and a size of the specific region based on information.

10. An imaging apparatus comprising:
a camera configured to generate a first captured image capturing a face of a subject in a moving body;

a controller configured to
- determine a direction of a line-of-sight of the subject and at least one of a position and an orientation of the face of the subject based on the first captured image, and
- change, as a specific region appears in a display apparatus, at least one of a position and a size of the specific region based on the determined direction of a line-of-sight of the subject and at least one of a position and an orientation of the face of the subject; and a communication interface configured to output information to the display apparatus indicating the specific region in the second captured image or an image of the specific region clipped from the first captured image.

11. A camera monitor system comprising:
an image processing apparatus including
- a communication interface configured to receive a first captured image capturing a face of a subject in a moving body, and to output an image of a specific region, which is clipped from either the captured image, to a display apparatus mounted in the moving body, and
- a controller configured to
  - determine a direction of a line-of-sight of the subject and at least one of a position and an orientation of the face of the subject based on the first captured image, and
  - change, as the specific region appears in the display apparatus, at least one of a position and a size of the specific region based on the determined direction of a line-of-sight of the subject and at least one of a position and an orientation of the face of the subject, wherein the display apparatus is configured to display the image of the specific region.

12. An image processing method comprising:

receiving a first captured image capturing a face of a subject in a moving body;

determining a direction of a line-of-sight of the subject and at least one of a position and an orientation of the face of the subject based on the first captured image;

changing, as a specific region appears in a display apparatus, based on the determined direction of a line-of-sight of the subject and at least one of a position and an orientation of the face of the subject, at least one of a position and a size of the specific region, which is clipped from either the first captured image or a second captured image different from the first captured image; and outputting an image of the specific region to the display apparatus mounted in the moving body.

* * * * *